Patented Dec. 3, 1940

UNITED STATES PATENT OFFICE 2,223,807

PROCESS OF PRODUCING ALKYL PEROXIDES AND HYDROPEROXIDES

Nicholas A. Milas, Belmont, Mass., assignor to Research Corporation, New York, N. Y., a corporation of New York No Drawing. Application July 26, 1939,
Serial No. 286,689

8 Claims. (Cl. 260—610)

This invention relates to an improved process for the production of alkyl peroxides, and hydroperoxides.

A method of producing alkyl peroxides has been known for some time. According to the known process, a pure, neutral, dialkyl sulfate was reacted with an alkali peroxide (or with hydrogen peroxide) in the presence of an alkali. Because of the difficulty inherent in producing neutral dialkyl sulfates, the known method has been found to be of very limited utility.

In the industrial production of certain alcohols, such, for instance, as iso-propyl, secondary butyl, tertiary butyl, and tertiary amyl alcohols, unsaturated hydrocarbon gases from cracked petroleums are allowed to react with various concentrations of sulfuric acid, phosphoric, hydrochloric and hydrobromic acids, or even silicic and boric acids, might be used, thereby producing mono-alkyl hydrogen sulfates (or corresponding alkyl salts) which are not isolated but decomposed with water to produce the corresponding alcohols. It is a primary object of the present invention to treat these mono-alkyl sulfates with hydrogen peroxide, under controlled conditions, to produce therefrom the alkyl hydroperoxides instead of alcohols as in the case when water alone is used.

In accordance with the process of the present invention, a mono-alkyl salt of an inorganic acid, e. g., mono-alkyl hydrogen sulfate, is reacted with hydrogen peroxide, the reaction mixture is neutralized by addition of a suitable carbonate, dried, and filtered. The anhydrous filtrate is or contains the alkyl peroxide (or hydroperoxide) product. The mono-alkyl salt used as the starting material may be obtained either by appropriately reacting the corresponding alcohol with the inorganic acid or by reacting a suitable unsaturated hydrocarbon with the inorganic acid. The following illustrate the possibilities in the case wherein sulfuric acid is employed as the inorganic acid:

A.

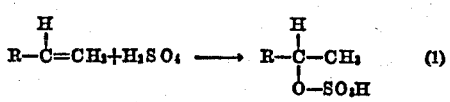

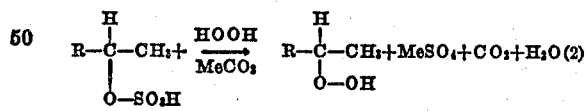

(wherein R represents a monovalent organic radical, and Me represents a metal) or

B.

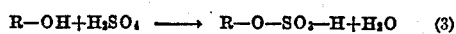

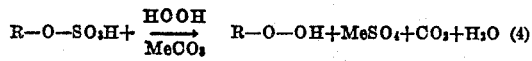

(wherein R represents a monovalent organic radical, and Me represents a metal). When another inorganic acid than sulfuric acid is employed, the same general course of reactions obtains.

The invention will now be described in greater particularity with reference to the following illustrative examples:

Example 1

Iso-butylene (1 mol) was added, slowly and with vigorous stirring, to 70% sulfuric acid (2 mols), maintained at a temperature of about −10° C. The reaction consumed about 30 minutes. To the reaction mixture hydrogen peroxide (2 mols) was then added slowly. The resulting mixture was allowed to stand for some hours at 0° to −5° C., and thereafter was neutralized with magnesium carbonate, filtered, and the non-aqueous peroxide layer was dried and analyzed for tertiary butyl peroxide. The percentage of tertiary butyl peroxide obtained was 44.3%.

Example 2

By a similar experiment using an equivalent amount of trimethylbutylene instead of iso-butylene as starting material, tertiary amyl hydroperoxide, in a yield of about 16% of theory, was produced.

Example 3

Similarly, when propylene (1 mol) is slowly added to 2 mols of 70% sulfuric acid maintained at a temperature of from about 0° to about −10° C., and the product is reacted with 2 mols of hydrogen peroxide in the cold and thereafter treated for recovery of the peroxidic product, by the procedure disclosed in Example 1 above, there is obtained, in good yield, isopropyl hydroperoxide. The course of the reaction may be illustrated graphically as follows:

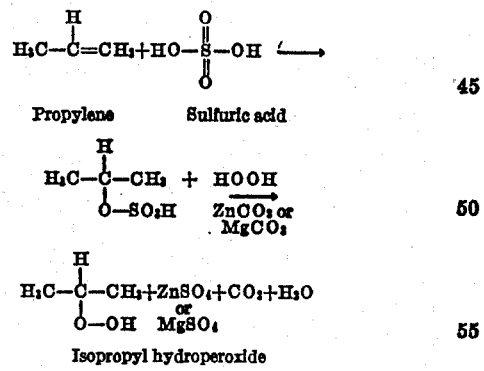

Illustrating the production of the peroxidic product from the corresponding alcohol is the following specific example:

Example 4

Sulfuric acid of about 70% strength was placed in a three-necked flask provided with a stirrer, a thermometer and a dropping funnel. The calculated amount of tertiary butyl alcohol (1 mol to about 0.5 mol of the acid) was then dropped slowly into the sulfuric acid which latter was rapidly stirred and was maintained at about 0° C. When all of the alcohol had been added, the calculated amount (2 mols) of hydrogen peroxide (30% strength) was added slowly, while the temperature of the reaction mixture was maintained at about 0° C.

The resulting reaction mixture was salted out with anhydrous sodium sulfate, and the non-aqueous layer was retained. This latter was then neutralized with anhydrous magnesium carbonate, and was further dried with anhydrous magnesium sulfate. The resulting product was analyzed and found to consist essentially of tertiary butyl hydroperoxide, $(CH_3)_3$—C—O—OH. The yield was about 99% of theory, based on the amount of the alcoholic starting material, or 27.1% based on the amount of hydrogen peroxide used.

In repetitions of the above experiment I have, after the completion of the reactions, proceeded by neutralizing the reaction mixture with magnesium carbonate, drying and filtering, without further separation by addition of anhydrous sulfate.

It is to be noted that in the carrying out of the process of the present invention I may use as starting material a higher boiling fatty alcohol (e. g., stearyl alcohol, or an unsaturated fatty alcohol of relatively high molecular weight, or a sulfonated higher fatty alcohol of the "gardinol" type) and produce a long-chain peroxide having useful properties.

It has been found that all the peroxides, except ethyl hydroperoxide, produced by this process are relatively stable; they are soluble in hydrocarbon mixtures such as petroleum ether.

I claim:

1. Process which comprises reacting with hydrogen peroxide a compound of the general formula R—O—SO$_3$H, where R is a monovalent aliphatic radical, and neutralizing the reaction product.

2. Process of producing alkyl peroxides and hydroperoxides, which comprises reacting a monoalkyl ester of an inorganic acid with hydrogen peroxide and neutralizing the resulting reaction product.

3. Process which comprises reacting with hydrogen peroxide a compound of the general formula R—O—SO$_3$H, where R is an alkyl radical, and neutralizing the reaction product.

4. Process of producing alkyl peroxides and hydroperoxides, which comprises reacting hydrogen peroxide with a monoalkyl sulfate in the cold, and neutralizing the reaction product with a metal carbonate.

5. Process of producing an alkyl peroxide, which comprises reacting an unsaturated hydrocarbon gas of the formula

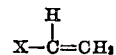

wherein X is a member of the group consisting of H and an alkyl radical, with sulfuric acid, in the cold, whereby to produce a monoalkyl sulfate, reacting the so-produced monoalkyl sulfate with hydrogen peroxide, and neutralizing the resulting reaction product.

6. Process of producing an alkyl peroxide, which comprises reacting an aliphatic alcohol with sulfuric acid, in the cold, whereby to produce a monoalkyl sulfate, reacting the so-produced monoalkyl sulfate with hydrogen peroxide, and neutralizing the resulting reaction product.

7. Process of producing an alkyl peroxide, which comprises reacting a monoalkyl sulfate with hydrogen peroxide, neutralizing the reaction mixture with a metallic carbonate, abstracting water from the neutralized mixture, and filtering the resulting anhydrous liquid from the associated solids.

8. Process of producing an alkyl peroxide, which comprises reacting a monoalkyl sulfate with hydrogen peroxide, separating the resulting reaction mixture into an aqueous portion and a non-aqueous portion, neutralizing the non-aqueous portion with a metallic carbonate, and drying the neutralized product.

NICHOLAS A. MILAS.